United States Patent [19]

Groeneweg et al.

[11] 4,348,285
[45] Sep. 7, 1982

[54] METHOD OF TREATING LIQUID AGRICULTURAL WASTES

[75] Inventors: Joost Groeneweg, Kreuzau-Drove; Manfred Schlüer, Grevenbroich, both of Fed. Rep. of Germany

[73] Assignee: Kernforschungsanlage Jülich Gesellschaft mit beschränkter Haftung, Jülich, Fed. Rep. of Germany

[21] Appl. No.: 239,118

[22] Filed: Feb. 27, 1981

[30] Foreign Application Priority Data

Mar. 4, 1980 [DE] Fed. Rep. of Germany ....... 3008127

[51] Int. Cl.³ ............................................... C02F 3/32
[52] U.S. Cl. .................................... 210/602; 210/605; 210/612; 47/1.4
[58] Field of Search ............... 210/602, 603, 612, 605, 210/620–624; 47/1.4

[56] References Cited

U.S. PATENT DOCUMENTS 3,955,318 5/1976 Hulls .................................... 210/602
4,086,161 4/1978 Burton ................................. 210/602
4,209,388 6/1980 De Fraites .......................... 210/602
4,267,038 5/1981 Thompson .......................... 210/602

Primary Examiner—Benoît Castel
Attorney, Agent, or Firm—Becker & Becker, Inc.

[57] ABSTRACT

Purification of liquid agricultural wastes, such as, in particular, liquid manure, by means of an algae/bacteria mixture culture and a subsequent rotifer culture in a separate stage. The pH-value of the algae/bacteria mixture culture is controlled, especially by the waste water charging thereof, in such a way that a multiplication of rotifers in this stage is inhibited or precluded. The algae/bacteria mixture culture preferably occurs in shallow open air ponds for a period of time which depends upon the temperature and can amount to three to six days at a mean temperature of approximately 18° C. The hold time of the algae/bacteria suspension which is in the rotifer container and is adjusted to a pH of 6 to 8 can range from two to four days at a temperature of approximately 20° C. A waste water treatment plant or system for the foregoing includes at least one algae/bacteria mixture culture reservoir and at least one rotifer reactor.

11 Claims, 1 Drawing Figure

U.S. Patent  Sep. 7, 1982  4,348,285
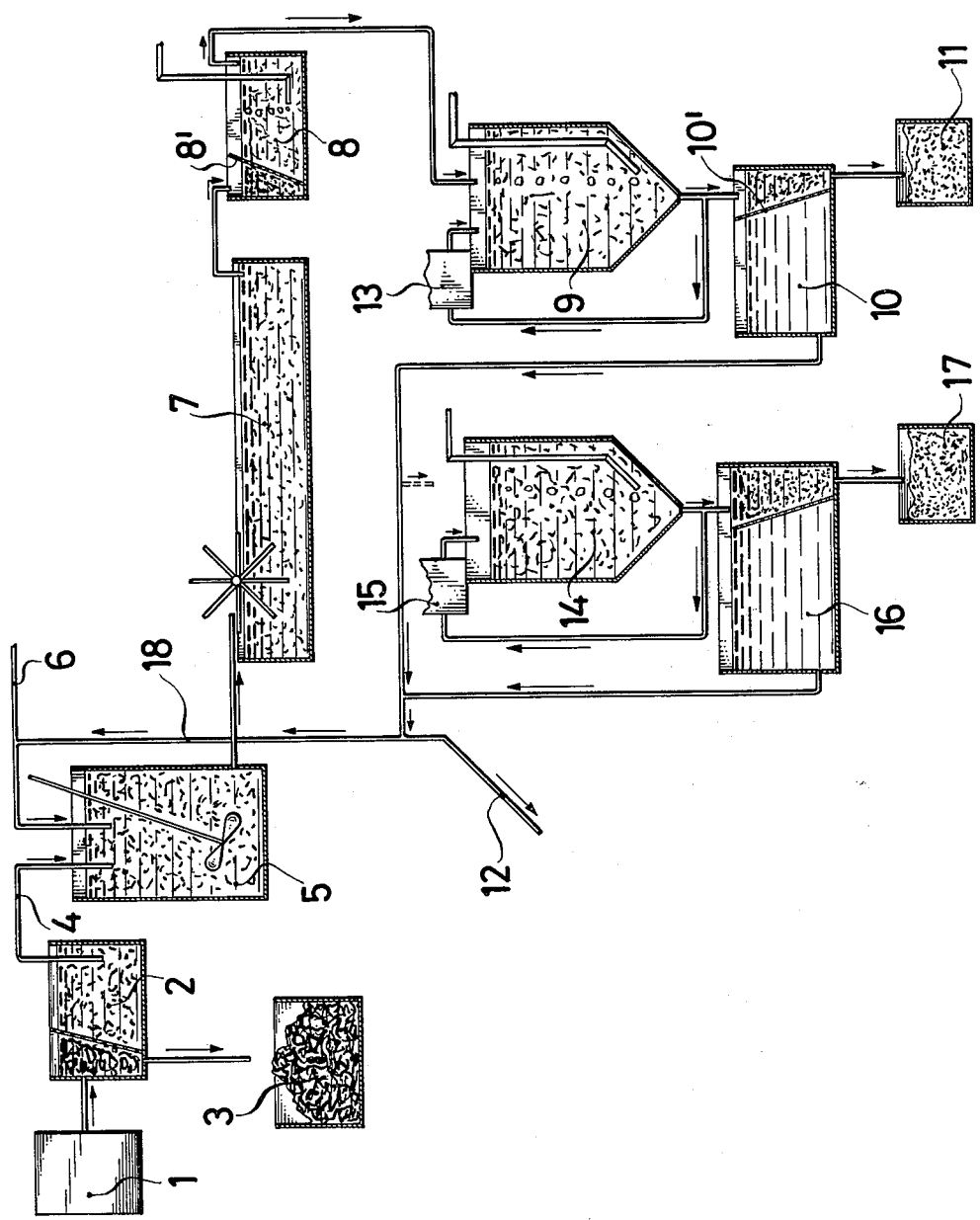

METHOD OF TREATING LIQUID AGRICULTURAL WASTES

The present invention relates to a method of and system for treating liquid agricultural wastes, which may suitably be anaerobically pretreated; the waste water is subjected to an algae/bacteria mixture culture for purification.

The purification of waste water, including biological waste water, with the aid of algae has been known for a long time (see, for instance, U.S. Pat. No. 3,882,635-Yamanaka et al, issued May 13, 1975). However, practical application thereof on a broad basis presents difficulties with regard to the separation and removal of the algae from the purified water. Sedimentation and coagulation, accompanied by the addition of suitable coagulants, are known for this purpose. However, they have the disadvantage that most coagulants themselves have a toxic effect, and the biomass is concentrated with heavy metals. Further mechanical harvesting methods are known, such as simple screening, which, however, is not feasible with most algae growing in waste water because the algae are too small. The likewise known removal with the aid of separators, such as nozzle and plate separators, requires considerable energy and high apparatus cost.

It is therefore an object of the present invention to provide a refinement of waste water purification with algae, particularly purification of biological waste waters, to make possible a reliably operating system, and to essentially eliminate the problems with the separation of particulate matter from the discharge.

This object, and other objects and advantages of the present invention, will appear more clearly from the following specification in connection with the accompanying drawing, which is a flow diagram of a sample embodiment used to practice the inventive method.

The present inventive method is characterized primarily by controlling the pH-value of the algae/bacteria mixture culture in such a way that the multiplication of rotifers is prevented, by subsequently supplying the algae/bacteria suspension thus obtained to an aerated culture- or breading-container having rotifers after controlling the conditions or the supplied suspension for the rotifer culture, and finally by separatng the rotifers from the purified water.

It should be noted that a rotifer or wheel-animalcule may be defined as any of a group of microscopic, structurally complex waer animals with one or more rings of cilia on a disc at the anterior end of the body; a rotifer or wheel-animalcule is so called because in some varieties the cilia, when active, look like rotating wheels.

Although the breeding of rotifers accompanied by feeding with algae has been known for a long time (Agrobiol. Zhurnal IV No. 5, 1968, Pages 39–46), generally for this purpose bred algae-monocultures were utilized along with the addition of conventional nutrients such as ammonium nitrate and phosphate, as well as carbon dioxide as a carbon source, whereas the known sensitivity (especially $NH_4^+$ susceptibility) of rotifer cultures to external influences quite obviously stood in the way of the use of rotifers for reating agricultural wastes.

Furthermore, difficulties often arise with waste water purification systems using algae/bacteria mixture cultures since, according to the charging or to the irradiation of the sun, foreign populations occur which inhibit or preclude the algae growth and in so doing destroy the function of the entire algae/baceteria system for a long time.

It was discovered that a thoroughly successful operation is possible if the algae/bacteria culture is strictly separated from the rotifer culture, and if in the first stage of the algae/bacteria mixture culture the pH-value is so controlled that a rotifer multiplication is precluded, which particularly can be attained by way of the waste water-loading or charging of the culture. Preferably, the pH-value is to be kept above 8.5 at least for hours, especially during the day.

After sufficient purification of the water with algae/bacteria, the resulting mass is supplied in a second stage while taking into consideration the culture conditions or reqirements of a rotifer culture necessary for the rotifers. In particular, to this end the algae/bacteria suspension freed of coarse contamination or dirt is adjusted to a pH-value of approximately 6 to 8 (for instance by inroduction of $CO_2$ or simple by aeration, particularly in the dark), and the rotifer culture is carried out at 15° C. to 25° C.

Surpirisingly, a satisfactory waste water purification is attained by this at least two-stage method, even though at first it was feared that a certain "new contamination or pollution" would occur as a result of the by-products of the rotifers.

The rotifers finally obtained with the inventive method can serve in an excellent manner as food or nourishment for young fish, the breeding of which can expediently take place in a location directly adjacent to the waste water purification.

The present inventive method is capable of being carried out continuously and also discontinuously, whereby the particular culture run can be readily adapted to the prevailing conditions of temperature, pH-value, light admission, germination count, and so forth. Preferably, there is provided a hold time of the waste water in the algae/bacteria mixture reactor for approximately three to six days at a mean temperature of approximately 18° C., and a hold time of the algae/bacteria suspension in the rotifer container for approximately two to four days at a mean temperature of approximately 20° C.

As algae, especially species of Chlorella or Scenedesmus can be used, such as *Scenedesmus armatus, Scenedesmus acutus, Scenedesmus opoliensis,* and *Scenedesmus acuminatus.* Particularly investigated was the algae *Scenedesmus falcatus* in combination with the rotifer *Brachionus rubens.*

According to further features of the present invention, liquid manure obtained during cattle or livestock breeding may be used as the liquid waste. The waste waters may be used in shallow open air ponds for an algae/bacteria mixture-culture while undergoing slight stirring or turning over. The rotifer culture may occur in the absence of light. The rotifers may be separated by screening from the purified water. The liquid manure for the algae/bacteria mixture culture may be diluted by a ratio of approximately 1:20 with water. The rotifer culture may be operated under continuous partial recycling. The liquid remaining after separation of the rotifers which have formed may be subjected to a second rotifer culture which digests Ciliates. Epiphanes senta may be used for the second culture.

The system for purifying waste water according to the foregoing method should have at least one algae/- bacteria mixture culture reactor, and at least one rotifer reactor.

Referring now to the drawing in detail, this embodiment relates to the processing of liquid manure which flows from the stalls into a collecting tank 1. From there the liquid manure passes by means of a pump to a device 2, such as a vibrator screen, a centrifuge, or the like, for removal of the solids 3 from the liquid phase. This liquid 4 is diluted at 5 with tap water from the conduit 6, or with returned water, and is supplied continuously to an algae/bacteria open air reactor 7. This reactor 7 essentially comprises a shallow pond or trough, having a depth of up to 50 cm, in which the algae/bacteria mixture culture is kept moving, for instance by a blade or paddle wheel, to such an extent that an intensive penetrating light action is assured upon the entire mass. There is a step of an anaerobically pretreating the waste water prior to subjecting it to the algae/bacteria mixture culture. The algae/bacteria suspension in this reactor 7 has a theoretical retention time of approximately four to six days (in summer) depending upon the mean temperature, and should be longer during colder times of the year. This retention time is adjusted by the continuous supplying of diluted liquid manure.

The algae/bacteria suspension leaves the reactor 7 by overflow (with simultaneous control or regulation of the liquid level in the reactor 7), and passes by way of a coarse sieve 8', for removal of coarse dirt or contamination, such as larvae of insects, into an aerated intermediate tank 8. In this intermediate tank, if necessary, a temperature adjustment to 15° C.–25° C., and a pH-control to 6 to 8 can be undertaken, before the suspension is supplied continuously or discontinuously to the rotifer reactor 9.

This rotifer reactor 9 can be considerably deeper than the algae/bacteria reactor 7, and is particularly formed by a vessel or container which has a funnel-shaped bottom and is provided for avoiding greater temperature fluctuations therein. In this container, the suspension is continuously stirred or turned over, for instance by injection of air, and is supplied with oxygen. From the container 9, the rotifer culture formed therein passes into a separating device 10 for screening out of the rotifers or wheel-animalcule 11, with the liquid phase being rejected or discarded (at 12), or being used as diluting water (in 5). The rotifer culture can suitably be provided with an additional suspension cycle, with a separator 13 (for example lamella separator) for separation of manure or dirt particles from the rotifers. The theoretical retention time in the rotifer container ranges between two to four days at a temperature in the vicinity of 20° C. The algae species Scenedesmus falcatus formed the main algae/bacteria biomass constituent of a total concentration of approximately 500 mg/dry weight per liter of biological material. The rotifer container was inoculated with the rotifer Brachionus rubens. In the discharge of the rotifer container there were found 300 to 400 rotifers per milliliter.

According to a modification of the inventive method, the hold time in the rotifer reactor 9 is reduced to two days with simultaneous partial return of the suspension discharging from the container. With this procedure, in addition to the rotifers produced in unchanged quantities of 300 to 400 animalcules/ml, a population of Ciliates (Paramaecum sp.) of up to 4000 animalcules/ml developed.

After separation of the rotifers, for instance with the aid of a sieve 10' having a mesh diameter of approximately 80 to 150 $\mu$m, the Ciliate suspension was supplied to a second container 14 (suitably having a suspension cycle and separator 15), in which a culture of the rotifer Epiphanes senta was located. This culture was able to remove the Ciliates from the water. These rotifers can be harvested as desired either continuously or discontinuously by screening (at 16) and by collecting (at 17) in a manner analogous with that in the first container 9. The clean or purified water produced after the rotifer harvest can be discharged by way of 12 into a lake or river, or can to a great extent be utilized by way of 18 as diluting water.

The rotifers produced in this manner are highly suitable as inexpensive fish-breeding feed, whereby suitably even the screening out can be eliminated.

The water discharged at 12 is practically free of biodegradable impurities, and no longer represents a nuisance or burden. The relatively problematical separation of biomasses by coagulation, precipitation, or centrifuging off, which heretofore was necessary with biological waste water treatment with algae, is eliminated with the inventive manner of procedure, which additionally yields a highly usable product.

The present invention is, of course, in no way restricted to the specific disclosure of the specification and drawing, but also encompasses any modifications within the scope of the appended claims.

What we claim is:

1. A method of treating agricultural waste water which comprises the following sequential steps:
   anaerobically pretreating said waste water; subjecting said anaerobically treated waste water to an algae/bacteria mixture culture in a shallow open air pond for approximately 3 to 6 days at a mean temperature of about 18° C.;
   controlling and maintaining the pH of said algae/bacteria mixture culture in said pond to a value of at least 8.5 and above to thereby prevent the multiplication of rotifers therein, and to obtain an algae/bacteria suspension;
   supplying said algae/bacteria suspension for removal of the algae/bacteria to an aerated rotifer breeding reactor having a rotifer culture therein;
   holding said algae/bacteria suspension in said reactor for approximately 2 to 4 days at a mean temperature of about 20° C. and a pH of 6 to 8 for rotifer multiplication;
   separating said rotifers from the thusly treated suspension to obtain a purified water.

2. A method according to claim 1, in which said algae/bacteria mixture culture is based on Scenedesmus falcatus, and said rotifer culture is Brachionus rubens.

3. A method according to claim 1, wherein the waste water is liquid manure obtained during livestock breeding.

4. A method according to claim 3, which includes the step of diluting said liquid manure with water by a ratio of approximately 1:20.

5. A method according to claim 1, wherein the algae/bacteria mixture culture in said shallow open air pond is subjected to slight turning over.

6. A method according to claim 1, wherein the rotifers are produced in said reactor in the absence of light.

7. A method according to claim 1, wherein the rotifers are separated by screening.

8. A method according to claim 1, which includes the step of continuously partially recycling said separated rotifers.

9. A method according to claim 8, which includes the step of subjecting the liquid remaining after said step of separating said rotifers to a second rotifer culture which digests ciliates.

10. A method according to claim 9, which includes the step of using Epiphanes senta as said second culture.

11. A method according to claim 1, which includes the step of freeing said algae/bacteria suspension prior to supplying said suspension to said rotifer breeding reactor.

* * * * *